US011589569B2

(12) United States Patent
Rasa et al.

(10) Patent No.: US 11,589,569 B2
(45) Date of Patent: Feb. 28, 2023

(54) ROTATING BOOM CRADLE MECHANISM FOR AGRICULTURAL APPLICATOR

(71) Applicant: AGCO Corporation, Duluth, GA (US)

(72) Inventors: Joshua Aaron Rasa, Jackson, MN (US); Jeffrey Michael Zimmerman, Lake Park, IA (US); Mark Aron Crowley, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 463 days.

(21) Appl. No.: 16/771,919

(22) PCT Filed: Nov. 5, 2018

(86) PCT No.: PCT/IB2018/058658
§ 371 (c)(1),
(2) Date: Jun. 11, 2020

(87) PCT Pub. No.: WO2019/123041
PCT Pub. Date: Jun. 27, 2019

(65) Prior Publication Data
US 2022/0110310 A1    Apr. 14, 2022

Related U.S. Application Data

(60) Provisional application No. 62/608,442, filed on Dec. 20, 2017.

(51) Int. Cl.
*A01M 7/00* (2006.01)

(52) U.S. Cl.
CPC ........ *A01M 7/0078* (2013.01); *A01M 7/0075* (2013.01)

(58) Field of Classification Search
CPC .............. A01M 7/0053; A01M 7/0075; A01M 7/0078; A01M 9/0076; B05B 13/005
(Continued)

(56) References Cited

U.S. PATENT DOCUMENTS

| 6,012,648 | A | * | 1/2000 | Morris | A01M 7/0075 |
| | | | | | 172/683 |
| 7,364,096 | B1 | * | 4/2008 | Sosnowski | A01M 7/0075 |
| | | | | | 239/168 |
| 2006/0045715 | A1 | * | 3/2006 | Honermann | A01M 7/005 |
| | | | | | 414/723 |

FOREIGN PATENT DOCUMENTS

| CA | 2 229 152 A1 | 8/1999 |
| GB | 717 249 A | 10/1954 |

OTHER PUBLICATIONS

European Patent Office, International Search Report for related International Application No. PCT/IB2018/058658, dated Feb. 20, 2019.

* cited by examiner

*Primary Examiner* — Cody J Lieuwen

(57) ABSTRACT

An agricultural applicator machine has a frame and at least one horizontally extending boom assembly. The boom assembly pivots to a folded position in which it is secured in a boom-cradle mechanism. The boom-cradle mechanism includes a crossmember and a boom rest at an outer end of the crossmember, the boom rest having a rigid inboard boom stop, a rigid outboard boom stop, and a saddle portion. The inboard boom stop extends from the saddle portion in an out-of-phase configuration relative the outboard boom stop. The boom-cradle mechanism has a locking assembly having an actuator assembly configured to rotate the crossmember, and thus the cradle boom rest. The actuator assembly connects to the crossmember through a linkage assembly. The actuator assembly causes the crossmember to rotate causing the boom rest to move between an open position and a locked position.

20 Claims, 3 Drawing Sheets

(58) Field of Classification Search
USPC .................................................. 239/159–170
See application file for complete search history.

ROTATING BOOM CRADLE MECHANISM FOR AGRICULTURAL APPLICATOR

CROSS-REFERENCE TO RELATED APPLICATIONS

This application is a national phase entry under 35 U.S.C. § 371 of International Patent Application PCT/IB2018/058658, filed Nov. 5, 2018, designating the United States of America and published in English as International Patent Publication WO 2019/123041 A1 on Jun. 27, 2019, which claimed the benefit of the filing date of U.S. Provisional Patent Application 62/608,442, "Rotating Boom Cradle Mechanism for Agricultural Applicator," filed Dec. 20, 2017, the entire disclosure of each of which is incorporated herein by reference.

FIELD

This disclosure relates to agricultural applicator machines and, more specifically, to a boom-cradle mechanism configured to lock of a boom assembly of the applicator machine in a boom saddle structure in its inoperative, stowed position for transport on a roadway.

BACKGROUND

With conventional agricultural applicator machines, such as sprayers and spreaders, an operator may drive the machine forward in a field to dispense agricultural products such as fertilizer, insecticide, herbicide, seed, etc. Agricultural applicator machines dispense the agricultural products as solid granules or liquids. The agricultural applicator machine has a central product bin and a boom assembly to distribute the agricultural product across a wide swath as the boom support vehicle or implement passes through the field. Boom widths of between 60 and 120 feet are common.

The typical boom assembly is configured to pivot or fold between operative and inoperative positions relative to the boom support vehicle. In its operative position, the boom assembly commonly extends in a laterally outward direction from the boom support vehicle such that the agricultural applicator covers a large surface area with each pass across a field. The weight of the boom assembly generally correlates with the operative length of the boom.

Upon completing distribution of the agricultural products to the field, the boom assembly is typically configured to fold to a retracted, inoperative position because a boom of typical widths cannot be safely transported on public roads. The preferred folded, inoperative position of the boom assembly is generally parallel to the direction of travel of the support vehicle such that the boom assemblies and support vehicle have a narrow profile for transport from the field and on a roadway. This is done by a variety of hydraulic or manual fold steps.

Before transport, the boom assembly is mechanically retained close to the chassis of the support vehicle to make sure the boom assembly does not unintentionally extend on the road. The mechanism which retains the boom assembly is commonly called a boom rack, boom rest, or boom cradle. Although cradle structures are commonly employed on support vehicles, known cradle structures have drawbacks when transporting the folded boom assemblies. For example, when traveling on roadway in the inoperative, folded position, the boom assembly is known to bounce on the cradle structure. In fact, the boom assemblies can bounce out of the cradle structure, increasing potential opportunities for damage to the boom assembly and/or the cradle structure.

Therefore, there is a need or desire for enhanced cradle mechanism for restraining/locking a boom in a cradle structure for transport on the roadway. The cradle mechanism should be configured to be utilized with wide variety of boom carrying agricultural vehicles, applicators, and implements.

BRIEF SUMMARY

In one embodiment, an agricultural applicator machine has a frame and at least one horizontally extending boom assembly supporting a plurality of product-dispensing nozzles spaced along the boom assembly operable to distribute an agricultural product over a field as the agricultural applicator machine moves in a forward in direction in the field. The boom assembly is configured to pivot between an extended, operative position and a folded, inoperative position, and when in the folded, inoperative position, the boom assembly is secured in a boom-cradle mechanism. The boom-cradle mechanism includes a crossmember that extends generally perpendicular to a forward direction of travel of the agricultural applicator machine. The boom-cradle mechanism has a first boom rest at an outer end of the crossmember, the boom rest having a rigid inboard boom stop, a rigid outboard boom stop, and a saddle portion between the inboard and outboard boom stops. The inboard boom stop extends from the saddle portion in an out-of-phase configuration relative the outboard boom stop. The boom-cradle mechanism has a locking assembly having an actuator assembly configured to rotate the crossmember, and thus the cradle boom rest. The actuator assembly connects to the crossmember through a linkage assembly. The actuator assembly causes the crossmember to rotate causing the boom rest to move between an open position and a locked position. The open position allows movement of a boom assembly with the outboard boom stop rotated down out of the way and the inboard boom stop in position to catch the boom assembly as the boom assembly folds in. When in the locked position, both the inboard and outboard stops are in position to stop motion of the supported boom assembly.

This summary is provided to introduce concepts in simplified form that are further described below in the detailed description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent in view of the detailed description. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art, which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

A break-away assembly of the present disclosure allows a boom tip to break away to the rear or front or upwardly of the agricultural vehicle without damaging the agricultural vehicle or the boom arm when the boom tip impacts an obstacle or when a sufficient force is otherwise applied to the boom tip. Release of the boom tip diminishes the stress placed on the boom arm and mounting apparatus.

Figure 1:
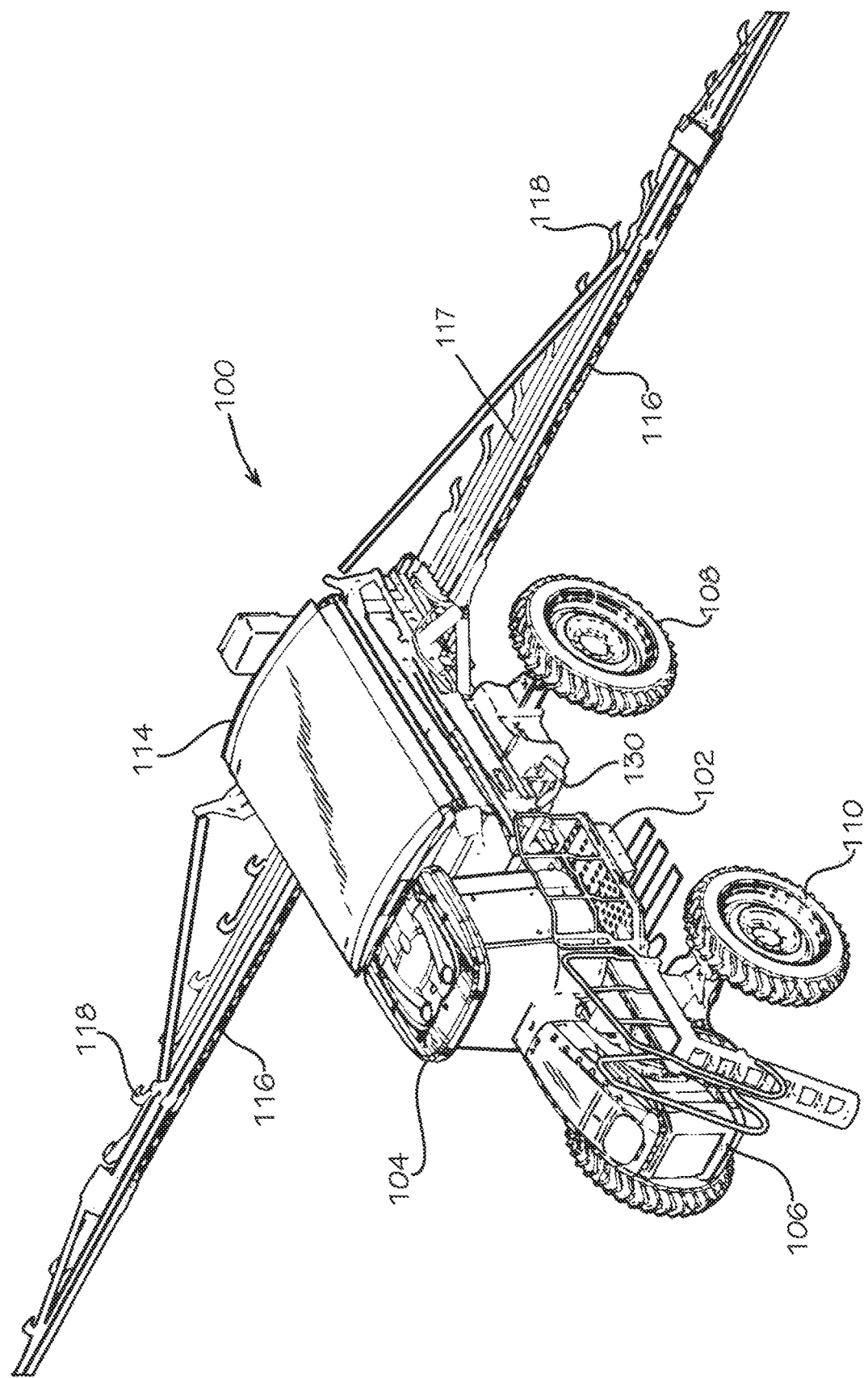
FIG. 1 is a front perspective view of a crop sprayer with exemplary boom arms and a boom-cradle mechanism.

FIG. 1 shows an agricultural applicator machine 100 having a frame 102, which may be of unitary construction or may include one or more pieces secured together. Typically, the frame 102 includes a support that spans the length of the agricultural applicator machine 100 and provides a structure for mounting components of the agricultural applicator machine 100. The agricultural applicator machine 100 generally also includes a cab 104 mounted on the frame 102. The cab 104 houses an operator and the controls for the agricultural applicator machine 100.

An engine 106 may be mounted on a forward portion of the frame 102 in front of the cab 104, or may be mounted on a rearward portion of the frame 102 behind the cab 104. The engine 106 is commercially available from a variety of sources and may include, for example, a diesel engine or a gasoline-powered internal combustion engine. The engine 106 provides a motive force to propel the agricultural applicator machine 100, and also provides energy to spray granular products from the agricultural applicator machine 100.

The frame 102 is supported by a pair of rear wheels 108 and a pair of front wheels 110. The rear wheels 108 (and/or the front wheels 110) may be driven by the engine 106 to propel the agricultural applicator machine 100. In particular, the engine 106 may generate mechanical energy that may be transferred to the rear wheels 108 (and/or the front wheels 110) by a transmission, drive shaft, and rear (and/or front) differential. The front wheels 110 (and/or the rear wheels 108) may be operable to steer the agricultural applicator machine 100. The propulsion and direction of the agricultural applicator machine 100 may be controlled by one or more operator controls that include, but are not limited to, an accelerator, a brake, a control handle, and a steering wheel.

The agricultural applicator machine 100 further includes a storage tank 114 for storing a granular product to be applied on a field. The granular product may include chemicals, such as but not limited to, herbicides, pesticides, or fertilizers. The storage tank 114 is usually mounted on the frame 102, either in front of or behind the cab 104. The agricultural applicator machine 100 may include more than one storage tank 114 to store different chemicals to be sprayed on the field. The stored chemicals may be dispersed by the agricultural applicator machine 100 one at a time, or different chemicals may be mixed and dispersed together in a variety of mixtures.

The agricultural applicator machine 100 further includes a pair of horizontally extending boom assemblies 116 that are operable to distribute the granular product over a wide swath in the field. In an exemplary embodiment, each boom assembly 116 is a truss assembly that supports a plurality of dry applicator lines 117 connected to a plurality of nozzles 118. The plurality of nozzles 118 may be spaced along the boom assembly 116; granular product is applied from the nozzles 118 as the agricultural applicator machine 100 is driven forward in direction in the field to distribute the chemicals onto crops in the field. Typically, an operator of the agricultural applicator machine 100 uses a control handle, located in cab 104, to control granular product dispersion through the nozzles of boom assembly 116.

The boom assemblies 116 are configured to pivot between the illustrated extended, operative position and a folded, inoperative position (not shown). In the folded, inoperative position, each of the illustrated pair of boom assemblies 116 is secured in a boom-cradle mechanism 130.

Figure 2:
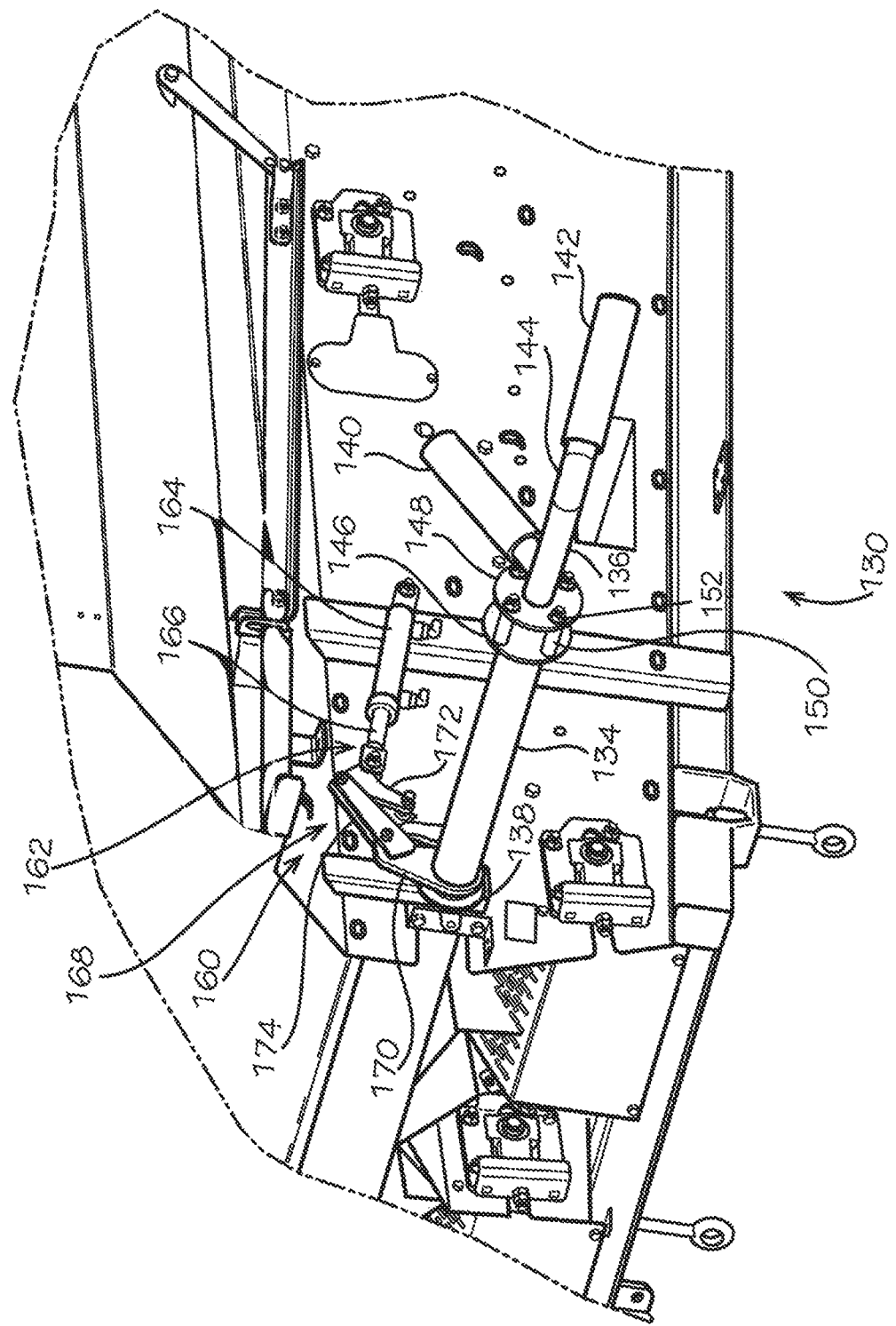
FIG. 2 is a perspective view of a boom-cradle mechanism in an open position to load the boom assembly in a folded, inoperative position on the cradle mechanism.
Figure 3:
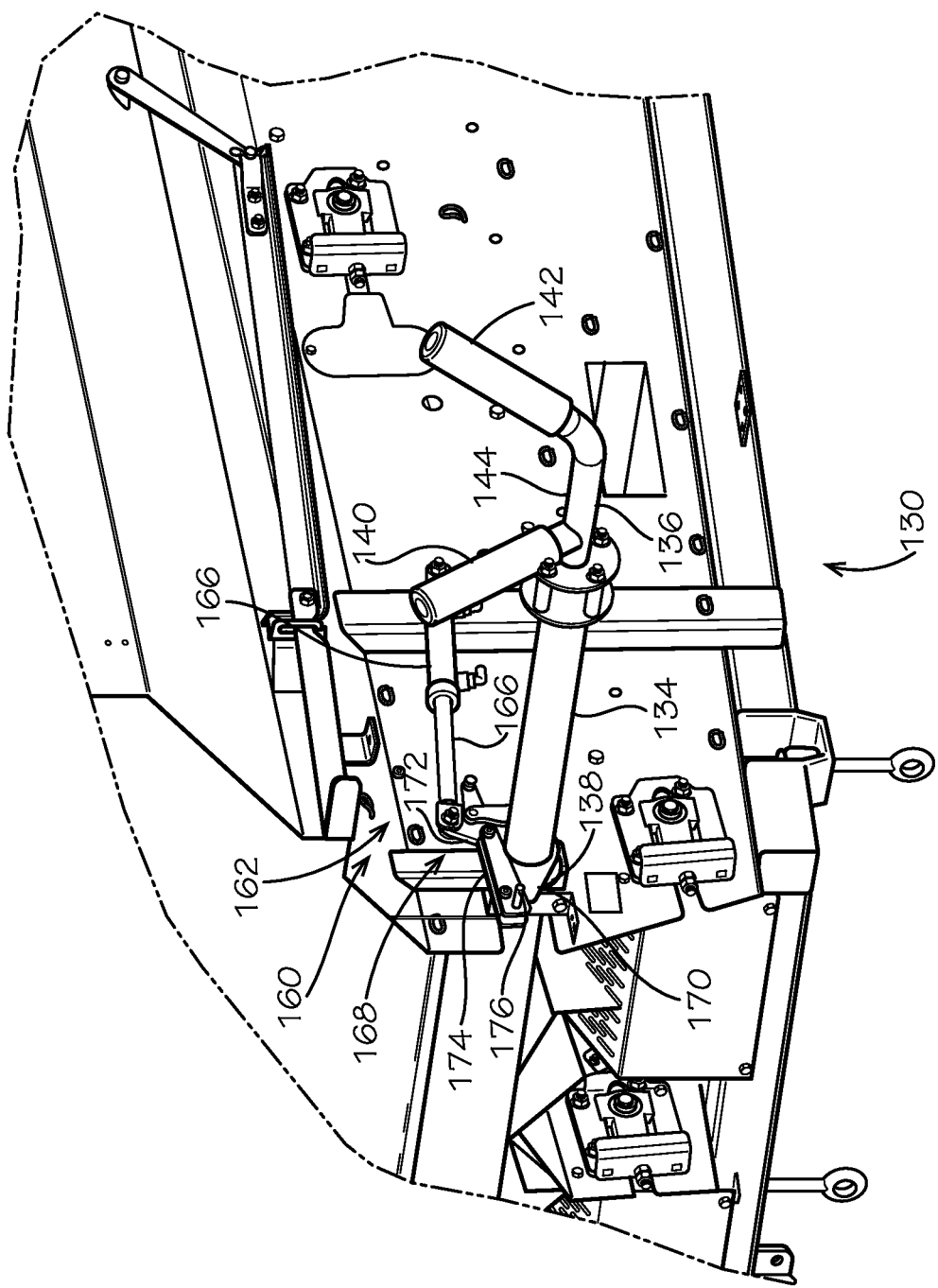
FIG. 3 is a perspective view of the boom-cradle mechanism of FIG. 2 in a locked position to retain the boom assembly in a folded, inoperative position.

One embodiment of the boom-cradle mechanism 130 is illustrated in FIGS. 2 and 3. The boom-cradle mechanism 130 includes a crossmember 134 that extends generally perpendicular to a forward direction of travel of the agricultural applicator machine 100. The crossmember 134 is shown as tubular shaped and supporting a first boom rest 136 at an outer end of the crossmember 134 for the boom assembly 116 on one side of the agricultural applicator machine 100 and a substantially similar boom rest 136 at the opposite end for the boom assembly 116 on the opposite side of the agricultural applicator machine 100. A vehicle mount 138 is positioned between the first and second boom rests 136 along a length of the crossmember 134 to secure the crossmember 134 to the frame 102 of the agricultural applicator machine 100. As the boom rests 136 on either side of the agricultural applicator machine 100 are substantially similar, only one will be described herein.

The boom rest 136 has an inboard boom stop 140 and an outboard boom stop 142 separated by a saddle portion 144. The inboard boom stop 140 and outboard boom stop 142 are rigid members extending from the saddle portion 144 and may be covered with rubber bump pads. The inboard boom stop 140 and the outboard boom stop 142 extend from the saddle portion 144 relative each other in an out-of-phase configuration such that when viewing the boom-cradle mechanism 130 directly along an axis of the saddle portion 144 and the crossmember 134, the inboard boom stop 140 and the outboard boom stop 142 form a V-shape.

In one embodiment, a first mounting plate 146 is attached to the crossmember 134 and a second mounting plate 148 is attached to the boom rest 136. A plurality of spacer tubes 150 (the illustrated embodiment has four tubes) is located between the first and second mounting plates 146, 148, and acts as a spacer in the normal operating configuration and needed width of the agricultural applicator machine 100. The spacer tubes 150 may have a length of between about three and four inches. Suitable bolts 152 are used to connect the second mounting plate 148 to the first mounting plate 146 with the plurality of tubes 150 between the two plates 146, 148. However, at times, such as during shipment, a narrower configuration is required to meet constraints on the width of the agricultural applicator machine 100. When a narrower configuration is needed, the spacer tubes 150 are rearranged such that the first mounting plate 146 abuts the second mounting plate 148, with the spacer tubes 150 moved to an inner side of the first mounting plate 146 around the crossmember 134. In this configuration, the mounting plates 146, 148 and spacer tubes 150 can still be held together using the same mounting bolts 152, allowing the cradle mechanism 130 to provide a narrower transport width for the agricultural applicator machine 100.

The boom-cradle mechanism 130 includes a locking assembly 160 that includes an actuator assembly 162 configured to rotate the crossmember 134, and thus the cradle boom rest 136. The actuator assembly 162 includes a hydraulic cylinder 164 having a rod 166 that connects to the crossmember 134 through a linkage assembly 168. In the illustrated embodiment, the linkage assembly 168 includes an arm 170 fixedly attached to the crossmember 134, a first link 172 pivotably coupled to the rod 166 of the hydraulic cylinder 164, and a second link 174 having a first end pivotably connected to the first link 172 and a second end pivotably connected to the arm 170. Extension of the rod 166 causes the crossmember 134 to rotate, causing the boom rest 136 to move between an open position and a locked position. When the boom-cradle mechanism 130 is in the open position, as shown in FIG. 2, which allows movement of a boom assembly 116, the outboard boom stop 142 is rotated down out of the way of the boom assembly 116, and the inboard boom stop 140 is in position to "catch" the boom assembly 116 as it folds in. When the boom rest 136 is rotated into a locked position as shown in FIG. 3, both the inboard and outboard stops 140, 142 are in position to stop motion of the supported boom assembly 116. A safety pin 176 may be used in the linkage assembly 168 when in the locked position to keep the crossmember 134 from rotating and permitting the boom assembly 116 from falling out of the boom rest 136 while traveling.

Desirably, the linkage assembly 168 is configured to attach to the crossmember 134 such that the linkage assembly 168 goes "over center" with respect to the crossmember 134 during extension of the hydraulic cylinder 164. This prevents the boom-cradle mechanism 130 from being unlocked by a force applied to the boom rest 136. In such embodiments, only a force applied from the cylinder side of the linkage assembly 168 can unlock the boom-cradle mechanism 130.

The boom locking assembly 160 may be operated by a remote electronic controller or a remote control switch (not shown). The remote controller may be located in the cab 104 of the agricultural application machine 100, yet the location of the remote controller can vary. In some embodiments, the remote controller includes a switch or other known controller that is configured to be operated by the operator in the cab 104 so as to communicate a signal (either via wireless transmission or by communication lines). In response to the signal from the controller, the locking assembly 160 moves the cradle mechanism 130 from its locked position (FIG. 3) to its open position (FIG. 2) so as to release the boom assembly 116 from the folded, inoperative position in the cradle mechanism 130. It is understood that one or more additional local control switches (not shown) can be located adjacent to each boom assembly 116 and connected to provide local control of operation of the boom locking assembly.

In operation, the boom-cradle mechanism 130 functions as follows. For example, the boom assembly 116 is initially positioned in the operative extended position (illustrated in FIG. 1), and the boom rest 136 is positioned in the open position (see FIG. 2). In a known matter, the boom assembly 116 is swung or rotated towards the cradle mechanism 130. The boom assembly 116 continues to move in a direction towards the cradle mechanism 130 and engages against the inboard boom stop 140. The cradle mechanism 130 is then rotated into the locked position as shown in FIG. 3, such that both the inboard and outboard stops 140, 142 are in position to stop motion of the boom assembly 116.

Although the subject of this disclosure has been described with reference to several embodiments, those skilled in the art will recognize that changes may be made in form and detail without departing from the spirit and scope of the disclosure.

What is claimed is:

1. An agricultural applicator having machine, comprising:
    a frame;
    at least one horizontally extending boom assembly supporting a plurality of product-dispensing nozzles spaced along the boom assembly and operable to distribute an agricultural product over a field as the agricultural applicator machine moves in a forward in direction in the field, wherein the boom assembly is configured to pivot between an extended, operative position and a folded, inoperative position; and
    a boom-cradle mechanism comprising:
        a crossmember that extends generally perpendicular to a forward direction of travel of the agricultural applicator machine;
        a first boom rest at an outer end of the crossmember, the first boom rest comprising a rigid inboard boom stop, a rigid outboard boom stop, and a saddle portion between the inboard and outboard boom stops, wherein the inboard boom stop extends from the saddle portion in an out-of-phase configuration relative the outboard boom stop;
        a locking assembly comprising an actuator assembly configured to rotate the crossmember and the boom-cradle mechanism, the actuator assembly connecting to the crossmember through a linkage assembly, the actuator assembly configured to rotate the crossmember and the first boom rest between an open position and a locked position, the open position allowing movement of the at least one boom assembly with the outboard boom stop rotated down out of the way and the inboard boom stop in position to catch the at least one boom assembly as the at least one boom assembly folds in, and when in the locked position, both the inboard and outboard stops are in position to stop motion of the at least one boom assembly.

2. The agricultural applicator machine of claim 1, wherein the at least one boom assembly comprises a pair of boom assemblies, each one of the pair of boom assemblies extending from opposing sides of the frame, and wherein the boom-cradle mechanism comprises the first boom rest at a first outer end of the crossmember on one side of the agricultural applicator machine and a second boom rest at a second, opposite, outer end of the crossmember on an opposite side of the agricultural applicator machine.

3. The agricultural applicator machine of claim 2, further comprising a vehicle mount positioned between the first and second boom rests along a length of the crossmember configured to secure the crossmember to the frame of the agricultural applicator machine.

4. The agricultural applicator machine of claim 1, wherein the inboard boom stop and the outboard boom stop extend from the saddle portion in an out-of-phase configuration relative to each other such that when viewed directly along an axis of the saddle portion and the crossmember, the inboard boom stop and the outboard boom stop form a V-shape.

5. The agricultural applicator machine of claim 1, wherein the boom-cradle mechanism further comprises a first mounting plate attached to the crossmember, a second mounting plate attached to the first boom rest, a plurality of spacer tubes placed between the first and second mounting plates, and a plurality of mounting bolts connecting the second mounting plate to the first mounting plate, wherein the plurality of spacer tubes can be configured in an operating configuration between the first and second mounting plates, and wherein the plurality of spacer tubes are configured to be rearranged for shipment of the agricultural applicator machine such that the first mounting plate abuts the second mounting plate with the plurality of spacer tubes moved to an inner side of the first mounting plate around the crossmember and held together using the mounting bolts to allow the boom-cradle mechanism to exhibit a transport width for the agricultural applicator machine narrower than an operating width.

6. The agricultural applicator machine of claim 1, wherein the actuator assembly comprises a hydraulic cylinder having a rod that connects to the crossmember through the linkage assembly.

7. The agricultural applicator machine of claim 6, wherein the linkage assembly includes an arm fixedly attached to the crossmember, a first link pivotably coupled to the rod of the hydraulic cylinder, and a second link having a first end pivotably connected to the first link and a second end pivotably connected to the arm, wherein extension of the rod causes the crossmember to rotate causing the first boom rest to move between the open position and the locked position.

8. The agricultural applicator machine of claim 7, wherein when the boom-cradle mechanism is in the open position, which allows movement of the boom assembly, the outboard boom stop is rotated down out of the way of the boom assembly and the inboard boom stop is in position to catch the boom assembly folding inward, and when the boom rest is rotated into the locked position, both the inboard and outboard stops are in position to stop motion of the boom assembly.

9. The agricultural applicator machine of claim 8, wherein the linkage assembly is attached to the crossmember such that a connection point of the linkage assembly goes over center with respect to the crossmember during extension of the hydraulic cylinder such that only a force applied from the cylinder side of the linkage assembly can unlock the boom-cradle mechanism.

10. An agricultural applicator machine, comprising:
a frame configured for movement through an agricultural field;
at least one horizontally extending boom assembly carried by the frame and supporting a plurality of product-dispensing nozzles, wherein the boom assembly is configured to pivot between an extended position and a folded position;
a crossmember extending from the frame;
a boom rest coupled to the crossmember, the boom rest comprising an inboard boom stop, an outboard boom stop, and a saddle between the inboard and outboard boom stops, wherein the inboard boom stop extends from the saddle in an out-of-phase configuration relative the outboard boom stop; and
an actuator coupled to the frame and connecting to the crossmember through a linkage assembly, the actuator configured to rotate the crossmember and the boom rest between an open position and a locked position, wherein in the open position, the outboard boom stop is at or below a level of the saddle and the inboard boom stop extends above the level of the saddle, and wherein in the locked position, the outboard and inboard boom stops each extend above the level of the saddle.

11. The agricultural applicator machine of claim 10, further comprising a storage tank carried by the frame, the storage tank in communication with the product-dispensing nozzles.

12. The agricultural applicator machine of claim 10, further comprising a plurality of wheels supporting the frame.

13. The agricultural applicator machine of claim 10, wherein the at least one horizontally extending boom comprises a pair of booms, each one of the pair of booms extending from opposing sides of the frame, and wherein the machine further comprises a second boom rest coupled to the crossmember at an opposite side of the frame from the boom rest.

14. The agricultural applicator machine of claim 10, wherein the inboard boom stop and the outboard boom stop are rigid members extending from different points along an axis of the saddle in an out-of-phase configuration relative each other such that the inboard boom stop and the outboard boom stop form a V-shape when viewed directly along the axis of the saddle.

15. The agricultural applicator machine of claim 10, further comprising:
a first mounting plate attached to the crossmember;
a second mounting plate attached to the boom rest;
at least one spacer; and
at least one mounting bolt connecting the second mounting plate to the first mounting plate;
wherein the at least one spacer can be configured in an operating configuration between the first and second mounting plates, and
wherein the at least one spacer can be configured in a shipping configuration such that the first mounting plate abuts the second mounting plate and the at least one spacer contacts only one of the first mounting plate or the second mounting plate.

16. The agricultural applicator machine of claim 10, wherein the linkage assembly comprises an arm fixedly attached to the crossmember, a first link pivotably coupled to the actuator, and a second link having a first end pivotably connected to the first link and a second end pivotably connected to the arm, wherein extension of the actuator rotates the crossmember and the boom rest between the open position and the locked position.

17. The agricultural applicator machine of claim 10, wherein the linkage assembly is attached to the crossmember such that a connection point of the linkage assembly passes directly over a longitudinal axis of the crossmember when the crossmember and the boom rest rotate from the open position to the locked position.

18. The agricultural applicator machine of claim 17, wherein a downward force of the boom on the boom rest when the boom rest is in the locked position does not cause the crossmember or the boom rest to rotate to the open position.

19. The agricultural applicator machine of claim 10, wherein the linkage assembly is configured to receive a safety pin when the crossmember and the boom rest are in the locked position to prevent movement of the linkage assembly.

20. The agricultural applicator machine of claim 10, wherein the inboard boom stop and the outboard boom stop each comprise rubber pads.

\* \* \* \* \*